United States Patent
Doak et al.

(10) Patent No.: US 7,111,102 B2
(45) Date of Patent: Sep. 19, 2006

(54) PORT ADAPTER FOR HIGH-BANDWIDTH BUS

(75) Inventors: David Doak, Wake Forest, NC (US); Garry P. Epps, Sunnyvale, CA (US); Guy Fedorkow, Bedford, MA (US); Mark A. Gustlin, Campbell, CA (US); Steven P. Holmes, Wake Forest, NC (US); Randall A. Johnson, Raleigh, NC (US); Promode Nedungadi, Santa Clara, CA (US); John P. Prokopik, Auburn, NH (US); Mohammed I. Tatar, Ottawa (CA); Michael J. Taylor, Pepperell, MA (US)

(73) Assignee: Cisco Technology, Inc., San Jose, CA (US)

( * ) Notice: Subject to any disclaimer, the term of this patent is extended or adjusted under 35 U.S.C. 154(b) by 336 days.

(21) Appl. No.: 10/680,842

(22) Filed: Oct. 6, 2003

(65) Prior Publication Data

US 2005/0149651 A1    Jul. 7, 2005

(51) Int. Cl.
*G06F 13/14* (2006.01)
*H04L 9/00* (2006.01)
(52) U.S. Cl. .............. 710/305; 710/104; 370/912
(58) Field of Classification Search .............. None
See application file for complete search history.

(56) References Cited

U.S. PATENT DOCUMENTS

| | | | |
|---|---|---|---|
| 5,793,987 A | 8/1998 | Quackenbush et al. | |
| 5,884,043 A | 3/1999 | Teplitsky | |
| 5,991,817 A | 11/1999 | Rowett et al. | |
| 6,054,942 A | 4/2000 | Stemmler | |
| 6,119,215 A | 9/2000 | Key et al. | |
| 6,163,543 A | 12/2000 | Chin et al. | |
| 6,163,824 A | 12/2000 | Quackenbush et al. | |
| 6,513,109 B1 | 1/2003 | Kerr et al. | |
| 6,792,561 B1* | 9/2004 | Mamata | 714/36 |
| 6,912,602 B1* | 6/2005 | Sano et al. | 710/22 |
| 2004/0028063 A1* | 2/2004 | Roy et al. | 370/402 |

(Continued)

FOREIGN PATENT DOCUMENTS

WO    WO 02/09551 A1    11/2002

(Continued)

OTHER PUBLICATIONS

International Preliminary Examining Authority, "Written Opinion," PCT/US03/37424, dated Jul. 26, 2005, 9 pages.

(Continued)

*Primary Examiner*—Rehana Perveen
*Assistant Examiner*—Brian Misiura
(74) *Attorney, Agent, or Firm*—Hickman Palermo Truong & Becker LLP

(57) ABSTRACT

A port adapter for connecting zero or more network interfaces to a host system having a SPI-4 bus is disclosed. The port adapter comprises zero or more network interfaces; a SPI-4 bus coupled to a host system to provide a communication channel between the host and the network interfaces; a control bus coupled to the host system for controlling and monitoring the port adapter; and interface logic that interfaces the SPI-4 bus and the control bus to the network interfaces. Methods are provided for selecting and using one of a small plurality of different packet formats for various networking technologies, so that the port adapter can hide details of the technology that it handles from the host system, and for operating the host system's SPI-4 bus at one of several speeds based on bandwidth requirements of the port adapter.

21 Claims, 6 Drawing Sheets

U.S. PATENT DOCUMENTS

| | | | |
|---|---|---|---|
| 2004/0153891 A1* | 8/2004 | Slutz et al. | 714/699 |
| 2005/0025055 A1* | 2/2005 | Jain et al. | 370/235 |
| 2005/0078601 A1* | 4/2005 | Moll et al. | 370/218 |
| 2005/0108518 A1* | 5/2005 | Pandya | 713/151 |

FOREIGN PATENT DOCUMENTS

| WO | WO 02/095511 A1 | 11/2002 |
|---|---|---|

OTHER PUBLICATIONS

Current Claims, PCT/US03/37424, 6 pages.

Modelware (Standards To Silicon) "Virtual Component Data Sheet PluriBus SPI4.2 Foundation", Jun. 30, 2001, http://www.modelware.com/products/productbriefs/spi4.2f.pdf>, 2 pgs.

Claims as filed from Application PCT/US03/37424 filed Nov. 20, 2003, 5 pages.

PCT International Search Report, International Application No. PCT/US03/37424, dated Sep. 14, 2004, 7 pages.

MODELWARE (Standard to Silicon)"Virtual Component Data Sheet PluriBus™ SP14.2 Foundation", Red Bank New Jersey, Jun. 30, 2001, 1 page.

XILINX, Inc., "Logicore™ POS-PHY Level-3 Link Layer Core V2.01", San Jose, CA, Aug. 29, 2003, 11 pages.

U.S. Appl. No. 09/791,062, G. Muntz.

U.S. Appl. No. 09/790,826, G. Muntz et al.

U.S. Appl. No. 09/791,070, G. Federkow et al.

* cited by examiner

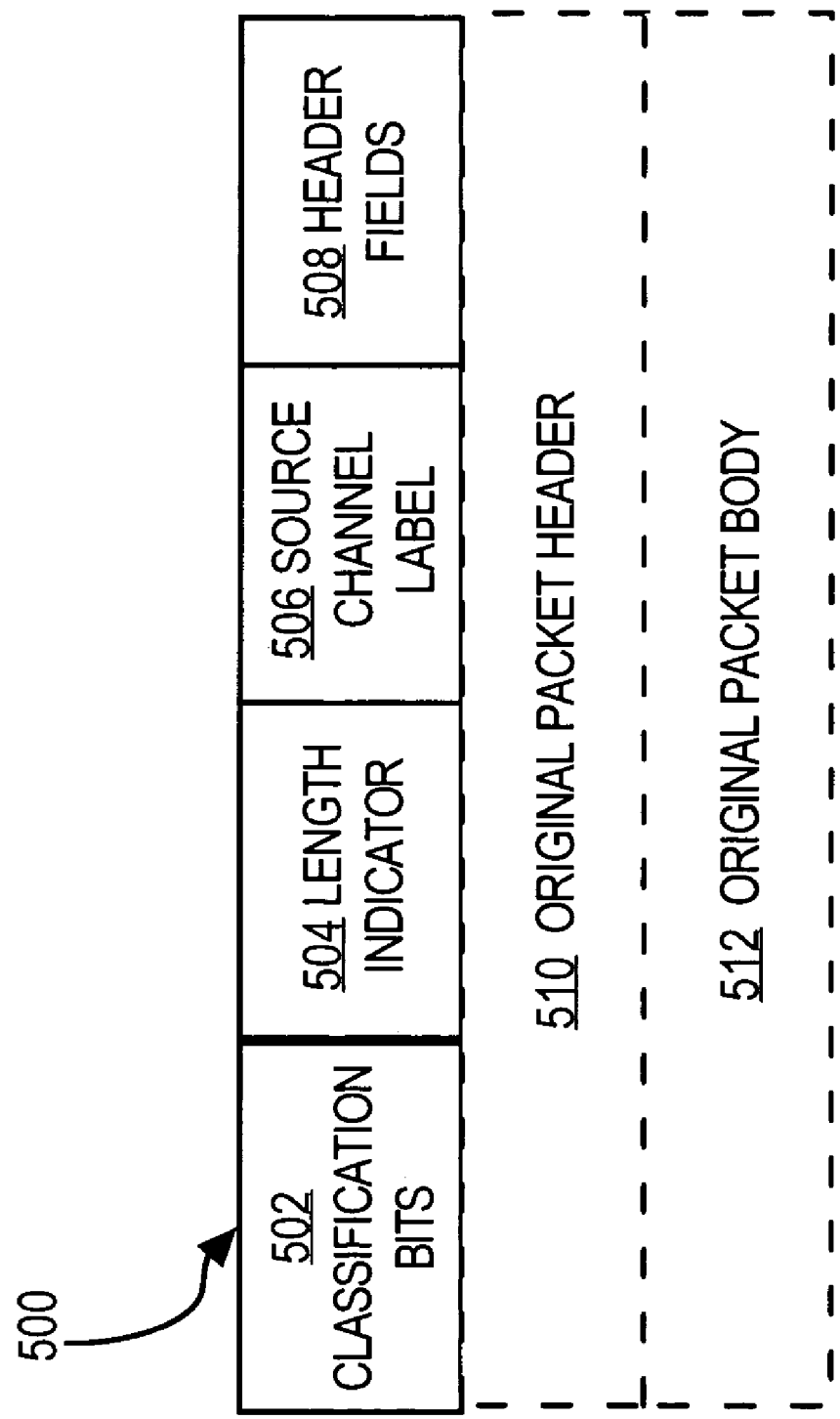

PORT ADAPTER FOR HIGH-BANDWIDTH BUS

CROSS-REFERENCE TO RELATED APPLICATIONS

This application is related to prior co-pending commonly assigned application Ser. No. 09/790,970, filed Feb. 22, 2001, entitled "Apparatus and technique for conveying per-channel flow control information to a forwarding engine of an intermediate network node," of Guy Fedorkow et al., the entire contents of which are hereby incorporated by reference as if fully set forth herein.

COPYRIGHT NOTICE

A portion of the disclosure of this patent document contains material which is subject to copyright protection. The copyright owner has no objection to the facsimile reproduction of the patent disclosure, as it appears in the Patent & Trademark Office patent file or records, but otherwise reserves all copyright rights whatsoever. Copyright © 2003 Cisco Systems, Inc.

CD-ROM APPENDIX

This disclosure includes a CD-ROM Appendix consisting of 134 pages in one file on one CD-ROM, the entire contents of which are hereby incorporated by reference as if fully set forth herein.

FIELD OF THE INVENTION

This invention generally relates to digital computer systems, and relates more particularly to digital computers that include a SPI-4 bus.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Digital computers use input/output (I/O) buses for transferring information between peripheral devices and a computer central processing unit and computer memory. I/O functions are also required in systems with multiple distributed processors and multiple distributed memories.

A variety of I/O bus architectures are used in such computer systems, including Personal Computer Interface (PCI). The System Packet Interface-4 bus is a relatively new high-bandwidth bus that is generally used in data packet processing systems for computer networks, such as high-speed routers and switches. Characteristics of the SPI4.2 bus architecture are described in an Interface Specification that is available in the document www.oiforum.com/public/impagreements.html. In this document, the term "SPI-4" is equivalent to "SPI4.2," and includes variants and equivalents of the SPI4.2 bus architecture.

Although the SPI-4 bus provides a high-speed communication path for packet data within a computer system, the SPI-4 bus is not suitable for direct communication to external networks or devices. Interfacing a host with a SPI-4 bus to a network normally requires providing logical or physical ports or interfaces that are coupled to other devices or networks. Some port adapters are architected as service adapters that have no ports or interfaces, but provide a particular kind of packet processing service for a host, such as compression or decompression, encryption or decryption, etc.

Users and manufacturers particularly desire to have host systems that can accommodate ports and interfaces that use different technologies, such as Ethernet, Fast Ethernet, Gigabit Ethernet, optical, serial or other interfaces. In one approach, a host router or switch is hard-wired with a variety of different ports. However, a user cannot re-configure such a host if the user's port requirements change. Such users and manufacturers want to have a host system that is adaptable to changing port and interface requirements.

Hot swapping may also damage some devices connected to the SPI-4 bus such as devices using Complimentary Metal Oxide Semiconductor (CMOS) technology. CMOS devices are exposed to large currents when inputs to CMOS receivers are within the CMOS switching region. Some CMOS receivers have two field effect transistors (FETs) connected in series with a first FET connected to a positive power supply rail and a second FET connected to a negative power supply rail. When the input to the two FETS is in the switching region, both FETs can be continuously turned on at the same time creating a DC current path directly through the CMOS device. The continuous on state of the two FETs can dissipate enough power to damage the CMOS device.

CMOS devices also experience latch-up conditions when an input is driven beyond one of the CMOS power supply rails. In the latch-up condition, parasitic transistors in the CMOS structure dissipate large amounts of power that can destroy the CMOS device. Both power dissipation conditions described above can result from hot swapping on the host interface bus.

U.S. Pat. No. 5,793,987 and U.S. Pat. No. 6,163,824 of Quackenbush et al. disclose a port adapter with separate PCI local bus and local bus, and associated processing methods. A port adapter is an electronic device that provides one or more ports and that plugs into a host system to provide additional features or functions for the host. The technology of Quackenbush et al. has been used in PCI bus-based port adapters in the Cisco 7200 Series Routers and Cisco 7500 Series Routers, from Cisco Systems, Inc., San Jose, Calif. However, the technology of Quackenbush et al. is not suitable for hosts having SPI-4 bus architectures because of vast technical differences between the PCI bus and the SPI-4 bus. For example, the PCI bus cannot process data that is arriving from interfaces at high rates such as 10 gigabits per second (Gbps).

Still another drawback of existing port adapters is that they do not interoperate seamlessly with heterogeneous network environments. For example, a host with a plurality of port adapters may communicate with external networks or devices using any of a large number of network technologies. As a result, data packets that are received at the port adapters may have any of a large number of different formats. Requiring the host system to understand and process a large number of different packet formats would be complicated and lack scalability to new technologies. Further, it would be impractical to have one generic packet format used between each type of port adapter and the host system, because of differences in the type and quantity of data carried in packets of different technologies.

Thus, there is a need for a port adapter that can process a particular packet format for a particular technology, and provides data to the host in a single consistent packet format for internal processing.

Based on the foregoing, there is a clear need in the relevant technical field for a port adapter that can interface a host system having a SPI-4 bus architecture to different network technologies. More broadly, there is a need for an apparatus that can provide a hot-pluggable adaptive interface from the SPI-4 bus of a host to external peripheral equipment.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a block diagram of a transformed packet format.

DETAILED DESCRIPTION OF THE PREFERRED EMBODIMENT

Figure 1:
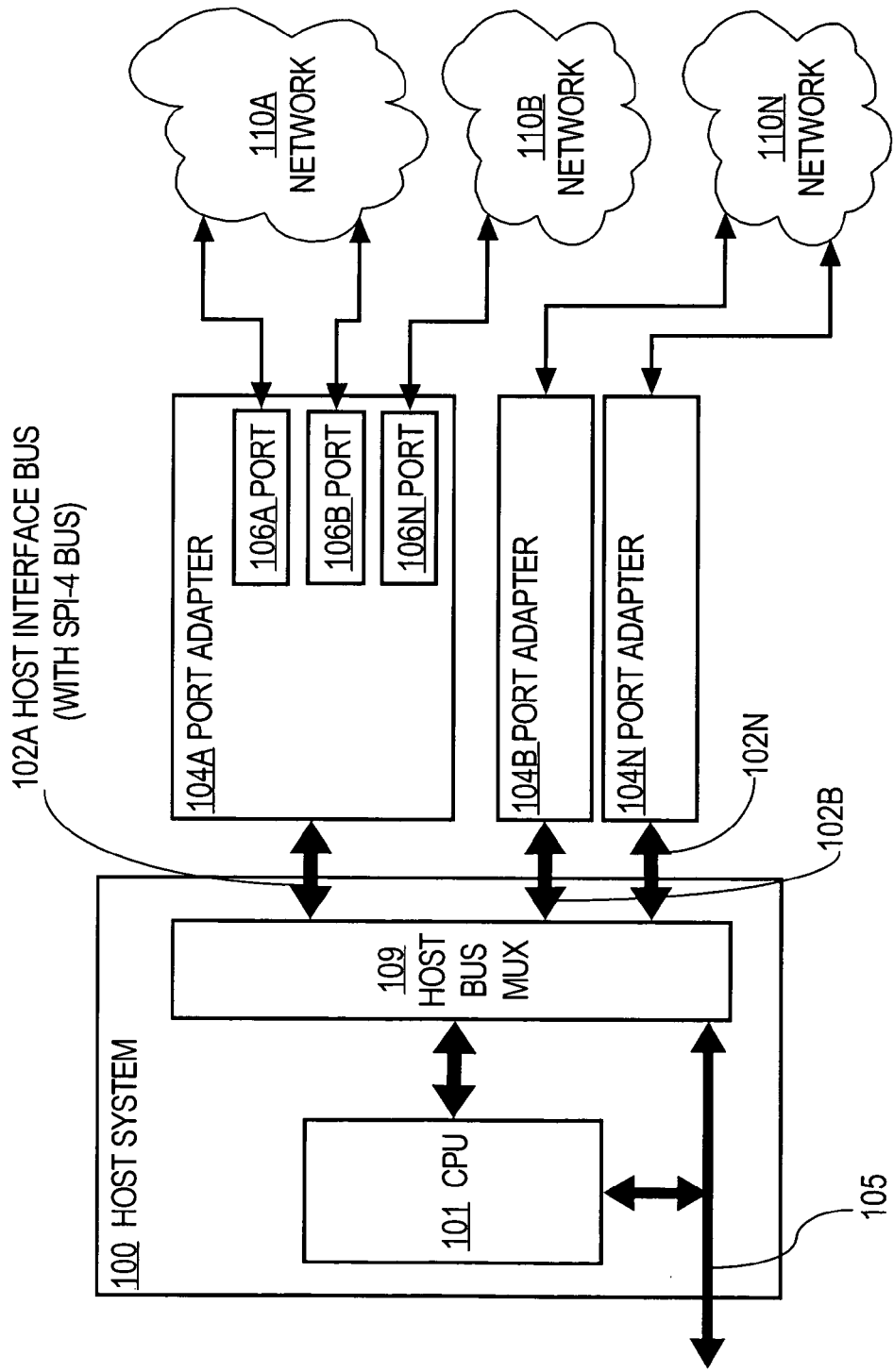
FIG. 1 is a block diagram that illustrates an overview of a host system with one or more port adapters.

A hot-pluggable port adapter for a high-speed bus is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
  2.1 Port Adapter Architecture
  2.2 Adaptation to Different SPI-4 Operating Speeds
  2.3 Extended Flow Control Bus
  2.4 Pre-Processing Packets with Port Adapter
3.0 Implementation Mechanisms—Hardware Overview
4.0 Extensions and Alternatives 1.0 General Overview The needs identified in the foregoing Background, and other needs and objects that will become apparent from the following description, are achieved in the present invention, which comprises, in one aspect, a hot-pluggable port adapter for connecting network interfaces to a host system through a SPI-4 bus. The port adapter communicates with the host system through a port adapter/host interface that includes the SPI-4 bus and a control bus; an extended flow control bus may be provided. Methods are provided for selecting and using one of a small plurality of different packet formats for various networking technologies, so that the port adapter can hide details of the technology that it handles from the host system, and for operating the host system's SPI-4 bus at one of several speeds based on bandwidth requirements of the port adapter.

According to one aspect, the invention provides a port adapter for coupling zero or more network interfaces to a host system having a SPI-4 bus, the port adapter comprising zero or more network interfaces; a SPI-4 bus coupled to a host system to provide a communication channel between the host and the network interfaces; a control bus coupled to the host system for controlling and monitoring the port adapter; and interface logic that interfaces the SPI-4 bus and the control bus to the network interfaces.

According to one feature, the interface logic comprises a field programmable gate array (FPGA), application-specific integrated circuit (ASIC), a combination of these and one or more other hardware elements, or a combination of one or more other hardware elements. According to another feature, an identity bus is coupled to the host system to allow identification of the port adapter by the host system. In yet another feature, an extended flow control bus is provided on which the port adapter may convey FIFO status to the host system on a plurality of separate logical channels. In still another feature, a clock bus communicates network timing information between a port and the host system, for providing synchronization of a port to another port, synchronization of a host system reference oscillator to a port, or synchronization of a port to a reference clock that is external to the host system.

The port adapter may further comprise a power control circuit that selectively generates power for the adapter during on line insertion and removal of the port adapter from the host system while the host system remains powered on. According to one feature, an identification repository stores a unique identifier of a type of the port adapter. In a related feature, the identification repository further stores one or more configuration parameter values associated with the port adapter. In yet another related feature, the identification repository comprises an electrically erasable programmable read only memory. The identification repository may store values that allow the host to determine whether the port adapter can be supported by the host system. The identification repository may store values that allow the host to determine one or more operating frequencies of the SPI-4 bus.

In another feature, an extended flow control bus is coupled to the host system that enables the adapter to communicate information on the SPI-4 bus using more than the 256 logical channels that are conventionally available using the SPI-4 bus. In a related feature, flow control interface logic for the flow control bus comprises a calendar-based mechanism that allows the port adapter to convey buffer fill status of thousands of logical channels to the host system. The extended flow control bus may comprise a TDM calendar frame sync signal, a flow control clock signal, a status signal, and a parity signal.

According to one feature, the adapter comprises zero interfaces, and wherein the interface logic is configured to receive one or more packets from the host system, transform the packets according to a specified function, and send the transformed packets to the host system. In a related feature, the specified function comprises encryption or decryption.

In another aspect, the invention provides a method of selectively determining an operating frequency for a SPI-4 bus of a host computer system that uses a port adapter, wherein the operating frequency may be different than a conventional SPI-4 bus operating frequency, comprising the steps of issuing a query from a host computer system having a SPI-4 bus to a port adapter, the port adapter comprising a SPI-4 bus that can be coupled to a host system for control and data between the host and the SPI-4 device, a control bus coupled in parallel with the SPI-4 bus between the host system and the port adapter for the port adapter independently from the SPI-4 bus, and interface logic that interfaces the SPI-4 bus and the control bus to one of a plurality of line interfaces, and an identification repository; receiving, from the identification repository, an identification of the port adapter; determining, based on the information received from the identification repository, whether the host system SPI-4 bus can operate at a frequency that is compatible with at least one of the SPI-4 bus operating frequencies that are supported by the port adapter; and setting an operating frequency of the host system SPI-4 bus equal to a selected one of the SPI-4 bus operating frequencies that are supported by the port adapter.

In one feature of this aspect, the setting step comprises setting the operating frequency of the host system SPI-4 bus equal to a fastest one of the SPI-4 bus operating frequencies that are supported by the port adapter. In another feature, the method includes powering-on the port adapter only when the host system SPI-4 bus can operate at a frequency that is compatible with at least one of the SPI-4 bus operating frequencies that are supported by the port adapter. In a related feature, the method comprises powering-on the port adapter only when one or more factors are satisfied, wherein the factors are selected from the set consisting of: the host system has software support for a packet format required by the port adapter; the port adapter dissipates less than a maximum amount of power dissipation allowed by the host system; the host system can match a bandwidth required by the port adapter; or a license authorization requirement associated with the port adapter allows the port adapter to run on the host system.

In another feature, the method further comprises receiving, from the identification repository, values that allow the host to determine whether the port adapter can be supported by the host system, and one or more operating frequencies of the SPI-4 bus. The method may further comprise receiving, from the identification repository, values that allow the host to determine a packet format of data that is sent across the SPI-4 bus by the port adapter. In a related feature, the method may further comprise receiving, from the identification repository, one or more values specifying a packet format of data that is sent across the SPI-4 bus by the port adapter.

In yet another aspect, the invention provides a port adapter for coupling zero or more network interfaces to a host system having a SPI-4 bus, the port adapter comprising: zero or more network interfaces; a SPI-4 bus coupled to a host system to provide a communication channel between the host and the network interfaces; a control bus coupled to the host system for controlling and monitoring the port adapter; interface logic that interfaces the SPI-4 bus and the control bus to the network interfaces; and packet processing logic for pre-processing packets received on the interfaces by performing the steps of: receiving a first packet on an ingress interface of the port adapter; creating a second packet that conforms to a selected one of the internal packet formats; transforming data from one or more fields of the first packet to one or more corresponding fields of the second packet; providing the second packet to a host system.

In one feature of this aspect, the packet processing logic further comprises the steps of moving a remainder of a packet header and packet body from the first packet into the second packet. The packet processing logic may be configured to perform the step of selecting one of a plurality of internal packet formats. The ingress interface may be, for example, an Ethernet interface, ATM interface, frame relay, serial interface, highly channelized interface, RPR interface, or POS interface, or any other interface now known or invented hereafter.

In other aspects, the invention encompasses a computer apparatus and a computer-readable medium configured to carry out the foregoing steps.

2.0 Structural and Functional Overview 2.1 Port Adapter Architecture

A pluggable port adapter is used to connect zero or more ports or interfaces to a host system through a SPI-4 bus to add functionality to the host system. Typically the ports or interfaces are high-bandwidth optical ports or interfaces. The port adapter communicates with the host system through a port adapter/host interface that includes the SPI-4 bus, a control bus, an extended flow control bus, and other signals and power lines. The ports or interfaces are configured and communicate in a normal manner over the SPI-4 bus while other functionality on the port adapter is controlled independently through the control bus.

In this document, the term "SPI-4" is equivalent to "SPI4.2" and includes variants of the SPI4.2 bus architecture. Thus, an embodiment may use a bus that strictly adheres to the SPI-4 specification, or may use variants, enhancements, modifications or improvements to the SPI-4 specification.

The host system uses a specialized identity bus to determine the identity of a port adapter, which the host system then uses to determine what programming and configuration is required. The control bus is used by the host system for configuring and controlling devices on the port adapter, and for updating programmable circuitry on the port adapter such as field programmable gate arrays (FPGAs). Alternatively, a JTAG bus can be used to update such programmable devices. FPGAs with volatile program memory must be programmed each time they are powered up and can be reprogrammed in the field by the host system to repair bugs and to enhance performance and/or functionality.

In one embodiment, the SPI-4 bus in the port adapter is coupled to SPI-4 termination logic, which is coupled to one or more network interfaces, such as a framer, ATM SAR, etc. In cooperation, the SPI-4 termination logic and network interfaces control zero or more ports, which are coupled to zero or more communication lines, devices, or networks such as local area networks (LAN) and wide area networks (WAN). The SPI-4 termination logic and network interfaces cooperate to receive data from the ports or interfaces and then retransmit the data on the SPI-4 bus in a reprocessed form, and to receive data from the host system and retransmit such data on a port.

The control bus can be used for programming logic on the port adapter such as interface logic, network interfaces and general-purpose registers or other programmable elements. The control bus also provides access to control interfaces of devices on the port adapter. The power bus is used, in conjunction with software that controls application of power, for conducting hot swap operations in which the port adapter is unplugged from or plugged into the host system while the host system either is powered and operating or is powered down. The port adapter may include a connector with one or more detect pins that are shorter than other power bus pins and other signal pins in the connector. In one embodiment, the shorter pins are at opposite ends of the connector. The shorter detect pins allow the port adapter and host system to anticipate and, in turn, respond to a hot swap condition by enabling power to the port adapter only after the port adapter is fully inserted. The shorter pins also enable the host system to determine that all pins are seated correctly. Upon removal of a port adapter, the short pins disconnect first and enable the port adapter to send signals to the host that are used to disable power to the port adapter.

When the port adapter is connected to the host system during a hot swap condition, control circuitry starts a controlled power-up sequence. When the port adapter is disconnected from the host system during a hot swap condition, the control circuitry starts a controlled power-down sequence.

A hot swap protocol between the port adapter and the host system discontinues data communications on the SPI-4 bus in the port adapter when the port adapter is not at an operational power level. When the port adapter is disconnected from the host system, signals coming from host circuitry are changed to known safe states to prevent potentially high currents from damaging devices during on-line insertion operations. The hot swap protocol also prevents corruption of data on the SPI-4 bus and corrupting logic states in the host.

A port adapter as disclosed herein can process data that is arriving from interfaces up to 10 gigabits per second (Gbps). In other embodiments, improvements to the SPI-4 bus architecture that allow faster data rates may be accommodated.

FIG. 1 is a block diagram that illustrates an overview of a host system with a port adapter. Generally, a host system 100 comprises a central processing unit (CPU) 101 that communicates with one or more port adapters 104A, 104B, 104N using host interface bus 102A, 102B, 102N which are multiplexed through host interface bus hub or multiplexer 109. Each host interface bus 102A, 102B, 102N includes a SPI-4 bus as well as other signals. CPU 101 may communicate with other circuits and devices using one or more other buses 105, such as an address bus, data bus, etc. For clarity, the depiction of system 100 is greatly simplified, and a practical system may include memory devices, I/O devices, route processors, network processors, a switch fabric, etc. System 100 may be implemented as a general-purpose packet-switching router or switch. In certain embodiments, system 100 comprises the Cisco 7300, 7600, 10000, or 12000 series products from Cisco Systems, Inc., San Jose, Calif.

Host system 100 may have one or more hot-pluggable port adapters 104A, 104B, 104N. There may be any number of port adapters in a practical system. A port adapter is also referenced herein by the equivalent term "shared port adapter" or SPA, or "versatile port adapter" or VPA. Each of the port adapters 104A, 104B, 104N comprises zero or more ports 106A, 106B, 106N. Each port is communicatively coupled to one of the networks 110A, 110B, 110N or devices within such networks using any suitable network communication technology, such as Ethernet, Fast Ethernet, Gigabit Ethernet, optical, serial or other interfaces. There may be any number of ports on a port adapter in a practical system. Each port 106A, 106B, 106N may be coupled to a different network 110A, 110B, 110N.

An embodiment with zero ports may comprise a service adapter in which the port adapter provides a computational or packet processing service rather than an interface function. A port adapter as described herein may have zero ports but may provide, for example, an encryption or compression function for the host. Further, in another embodiment a combination service adapter and port adapter may be provided that has one or more ports and also provides a packet processing service.

In the configuration of FIG. 1, each of the port adapters provides a mechanism for interfacing its ports to host interface bus 102A, 102B, 102N, respectively. Each of the port adapters 104A, 104B, 104N is hot pluggable, meaning that the port adapters can be removed from or installed into host system 100 while the host system is running. As a result, the host system 100 can be re-configured with different numbers of ports, or with ports that use different network technologies, while retaining the benefits of the SPI-4 bus architecture.

Figure 2:
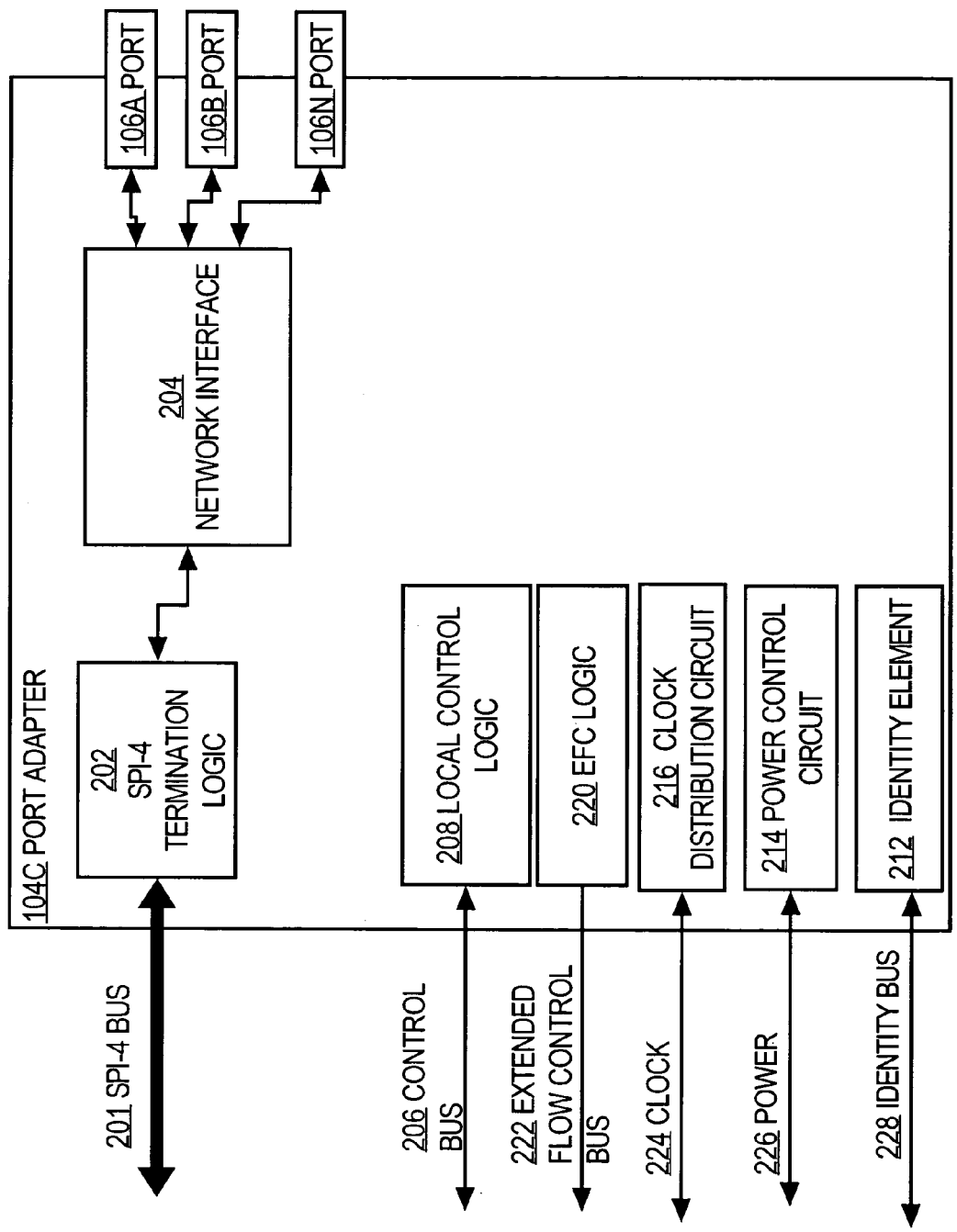
FIG. 2 is a block diagram that illustrates an overview of a port adapter for the SPI-4 bus.

FIG. 2 is a block diagram that illustrates an overview of one embodiment of a port adapter for the SPI-4 bus. Host system 100, which is omitted in FIG. 2 for clarity, is coupled to port adapter 104C through SPI-4 bus 201, control bus 206, extended flow control bus 222, clock bus 224, power control bus 226, and identity bus 228. Port adapter 104C comprises SPI-4 termination logic 202, which is communicatively coupled to SPI-4 bus 201 and to a network interface 204. In an embodiment in which ports 106A, 106B, 106N are Ethernet ports, network interface 204 may be a MAC (media access controller) that is responsible for rapidly forming and processing data frames, and can temporarily store data in memory. Alternatively, network interface 204 may comprise an ATM SAR, etc. Network interface 204 is communicatively coupled to ports 106A, 106B, 106N.

In the example of FIG. 2, one network interface 204 is shown. In other embodiments, a plurality of network interfaces may be provided, and each such network interface is coupled to SPI-4 termination logic 202. For example, there may be a different network interface 204 for each of the ports 106A, 106B, 106N.

In embodiments with zero ports, network interface 204 is omitted and other logic for performing packet processing services may be provided in its place. For example, an encryption engine or compression engine may occupy the same logical location as network interface 204.

Control bus 206 is connected to local control logic 208 in port adapter 104C. Identity bus 228 is connected to identity element 212, which can be queried by the host system 100 to determine the hardware arrangement and logical configuration of the port adapter 104C. The port adapter 104C further may include a power control element 214 and clock distribution circuit 216 that are respectively coupled to power control bus 226 and clock bus 224.

Extended flow control bus 222 is coupled to extended flow control logic 220. Details of the extended flow control bus are described further in a separate section below.

The port adapter 104C may be implemented as a plurality of integrated circuits that are mounted on one or more printed circuit cards that are enclosed in a protective housing. In one embodiment, each port adapter is mounted in a slot of a processing circuit card in the host system ("host card"). The port adapter housing may have any of several form factors, thereby providing a modular arrangement so that multiple different port adapters are interchangeable in the same host chassis. In one embodiment, a port adapter housing may have a half-height, full-height, double-wide, or high-power form factor based on the number and type of ports or interfaces provided in the port adapter, the amount of power dissipated by the port adapter, or the area required for the circuitry in the port adapter.

Local control logic 208, extended flow control logic 220, clock distribution circuit 216, power control circuit 214, and identity element 212 are represented in simplified, block form for clarity. In particular, connections to each such element are simplified, and each such element may have other connections in specific embodiments. Further, port adapter 104C may include circuit elements other than the specific elements that are shown in FIG. 2.

Figure 3:
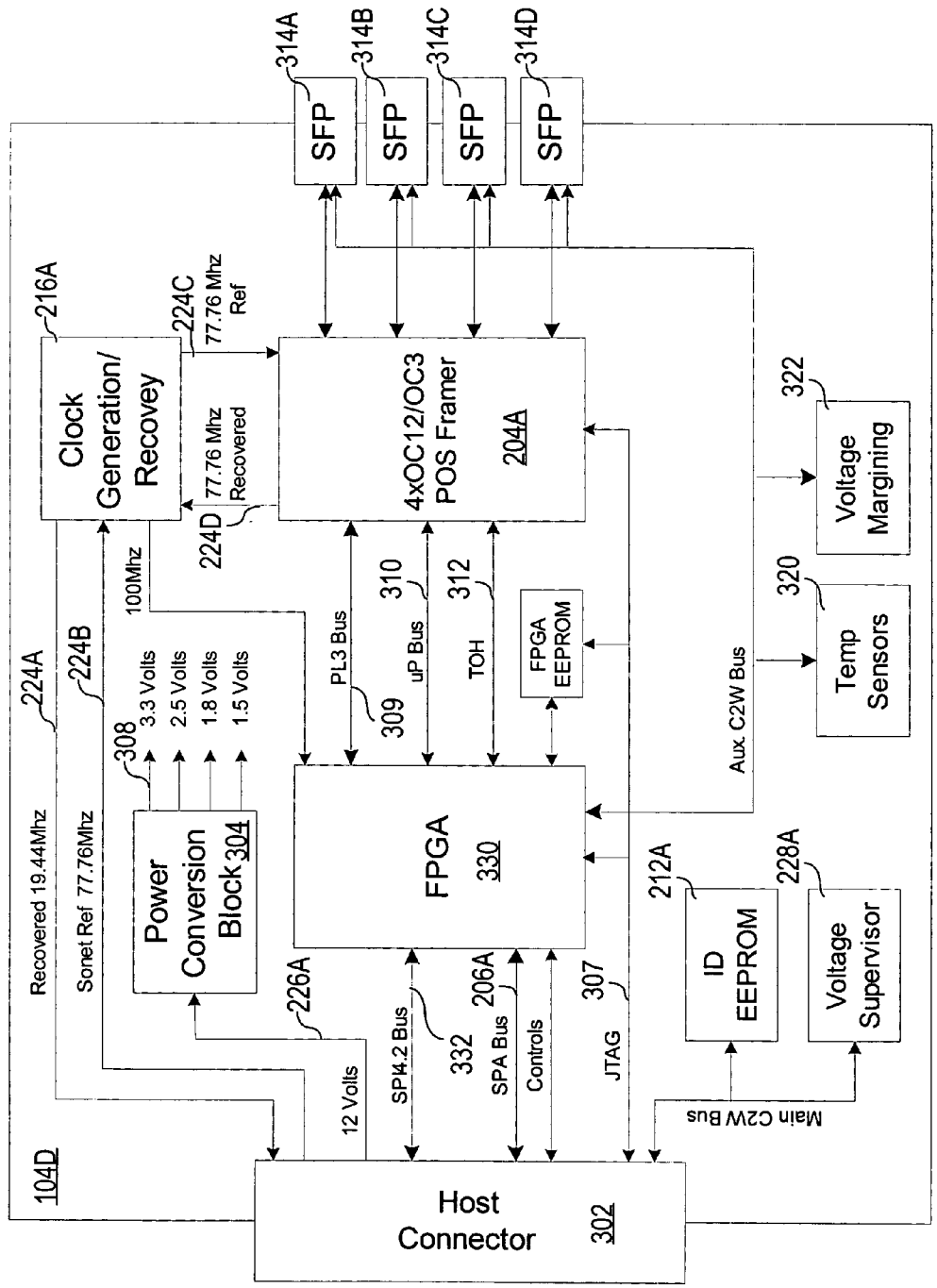
FIG. 3 is a more detailed block diagram of the port adapter of FIG. 2, according to one embodiment.

FIG. 3 is a more detailed block diagram of a port adapter of FIG. 2, according to one embodiment.

A host connector 302 provides a physical connection to the host system 100 (not shown in FIG. 3 for clarity) and carries clock, data, control, and power signals. A 12-volt power supply line 226A is coupled to a power conversion block 304 that provides a plurality of output power lines 308 at various voltage levels required by other elements of the port adapter 104D. In one embodiment, power conversion block provides outputs of 3.3V, 2.5V, 1.8V, and 1.5V; other output voltage levels may be provided in other embodiments. Further, power conversion block 304 may provide power sequencing, a power up/down function, power monitoring, power margining, etc.

SPI-4 bus 332 is coupled to FPGA 330. The SPI-4 bus 332 typically is an 86-pin packet data transfer bus that carries data bus signals, flow control signals, clock signals, etc. In certain embodiments, the operating speed of all such signals may be changed for compatibility among different hosts and port adapters, as further described herein. A SPA bus 206A is coupled from the host system 100 to the FPGA 330. SPA control bus 206A enables the host system to control and communicate with internal elements of the port adapter 104D. A JTAG bus 307 may carry test signals that are used for testing or PLD programming through communication among the host system 100 and programmable components; such as an FPGA 330 that implements the functions of SPI-4 termination logic 202 and local control logic 208 of FIG. 2. Host connector 302 may also carry miscellaneous signals for supporting online insertion and removal (OIR) operations, port adapter reset functions, etc.

FPGA 330 is coupled to framer 204A by a PL3 bus 309, microprocessor bus 310, and Transport Overhead (TOH) path 312. In one embodiment, framer 204A is the PM5360 S/UNI Multi-48 SONET/SDH framer, from PMC-Sierra, Inc., Santa Clara, Calif., which provides four (4) ports that are selectable between OC-12/STM-4 and OC-3/STM-1 bandwidth.

Framer 204A is coupled to one or more small form-factor pluggable (SFP) optics modules 314A, 314B, 314C, 314D that provide network ports and interfaces. The FPGA 330 detects insertion or extraction of the modules 314A, 314B, 314C, 314D to or from port adapter 104D.

Generally, FPGA 330 functions to decode and interface signals of the SPA bus 206A to signals from microprocessor bus 310. The FPGA 330 also provides control and status information relating to SFPs 314A, 314B, 314C, 314D. Further, the FPGA 330 provides bridging, queuing, and scheduling for communications among the PL3 bus 309 and SPI-4 bus 332, including management of ingress and egress FIFO queues, and the FPGA 330 may be involved in online insertion and removal and power control functions. The FPGA 330 is also configured for inserting and extracting SONET overhead information from packets that are communicated to or from the framer 204A. In one embodiment, FPGA 330 is implemented using the Xilinx 2V1500 and the SPI4, PL3, and HDLC IP cores.

Port adapter 104D also may include various other functional elements including clock generation/recovery module 216A, identity electrically erasable programmable read-only memory ("ID EEPROM") 212A, voltage supervisor 228A, temperature sensors 320, and voltage margining unit 322. The clock generation/recovery module 216A receives a 77.76 MHz SONET reference clock 224B from the host through host connector 302, provides a recovered 19.44 MHz clock 224A to the host via host connector 302, provides a 77.76 MHz reference clock 224C to the framer 204A, and receives a recovered 77.76 MHz clock signal 224D from the framer. The use of a recovered clock enables the clock generation/recovery module 216A to derive a system clock from any attached SONET port. The clock generation/recovery module 216A also generates a 100 MHz clock for operating FPGA 330.

The temperature sensors 320 may have a programmable temperature range for detecting and signaling over-temperature problems.

Optionally, an extended flow control bus coupled from host system 100 to the port adapter 104D functions to provide back pressure for port adapters with very high counts of physical or virtual ports. For example, in ATM, numerous virtual circuits may be present on one physical link. Thus, the extended flow control bus may be used for highly channelized port adapters, ATM port adapters, etc.

A detailed specification for an embodiment of a port adapter is provided in the Appendix to this document, the entire contents of which are hereby incorporated by reference as if fully set forth herein.

2.2 Adaptation To Different SPI-4 Operating Speed Rates

The host system 100 can query the ID EEPROM 212A using an identity bus 228A to determine the configuration of the port adapter 104D and to perform power control functions. In one embodiment, bus 228A conforms to the I2C signal format. The ID EEPROM 212A is an example of an identification repository. Based on the identifying information, software executed by the host system determines values specifying an operating frequency of the port adapter, and the format of data that is sent across the SPI-4 bus. For example, the host system software may include a lookup table that maps bus speed values, data packet formats, etc., to various port adapter identifiers. In an alternate embodiment, the identification repository stores bus speed values, data packet formats, and other configuration parameters in association with one or more port adapter identifiers for that port adapter or several different port adapters.

The information in the identification repository enables the host system to adapt its operational behavior to particular characteristics of the port adapter or its ports. For example, the standard operating frequency of the SPI-4 bus is 350 MHz ("full rate SPI-4"). However, not all port adapters require this frequency. For example, a port adapter that supports an aggregate data communication bandwidth of greater than 2.4 Gbps on its interfaces may require a full rate SPI-4 bus, but other port adapters that support only aggregate data communication bandwidth of less than or equal to 2.4 Gbps may operate adequately using SPI-4 bus signaling at less than 350 MHz.

Therefore, in one embodiment, the SPI-4 bus of port adapter 104D may be configured to operate at a quarter-rate speed of 87.5 MHz. In other embodiments, the SPI-4 bus of port adapter 104D may be configured to operate at any other speed, e.g., 700 MHz providing double-rate speed, etc. The identification repository of a port adapter contains a port adapter type identifier. Based on the port adapter type identifier, software executed by the host system can determine whether the port adapter supports a full rate SPI-4 bus speed, quarter rate, or both, or some other speed. Generally, in one embodiment, 1. A port adapter 104D that supports a total bandwidth less than or equal to 2.4 Gbps on its interfaces must support quarter rate on its SPI-4 bus, and may also optionally support full rate;

2. A port adapter that supports a total bandwidth of greater than 2.4 Gbps on its interfaces must support full rate on its SPI-4 bus, and may optionally also support quarter rate.

Host systems should conform to similar rules to ensure bandwidth compatibility across the SPI-4 connection to a port adapter. Thus, 3. A host system that supports a bandwidth of less than or equal to 2.4 Gbps in any of shared port adapter slot must support quarter rate on the SPI-4 bus for that slot, and may also optionally support full rate;
4. A host system that supports bandwidth of greater than 2.4 Gbps in any slot must support full rate on the SPI-4 bus for that slot, and may optionally also support quarter rate.

Using this arrangement, the host system may query the identification repository and adapt its operational behavior based on information in the identification repository.

Figure 4A:
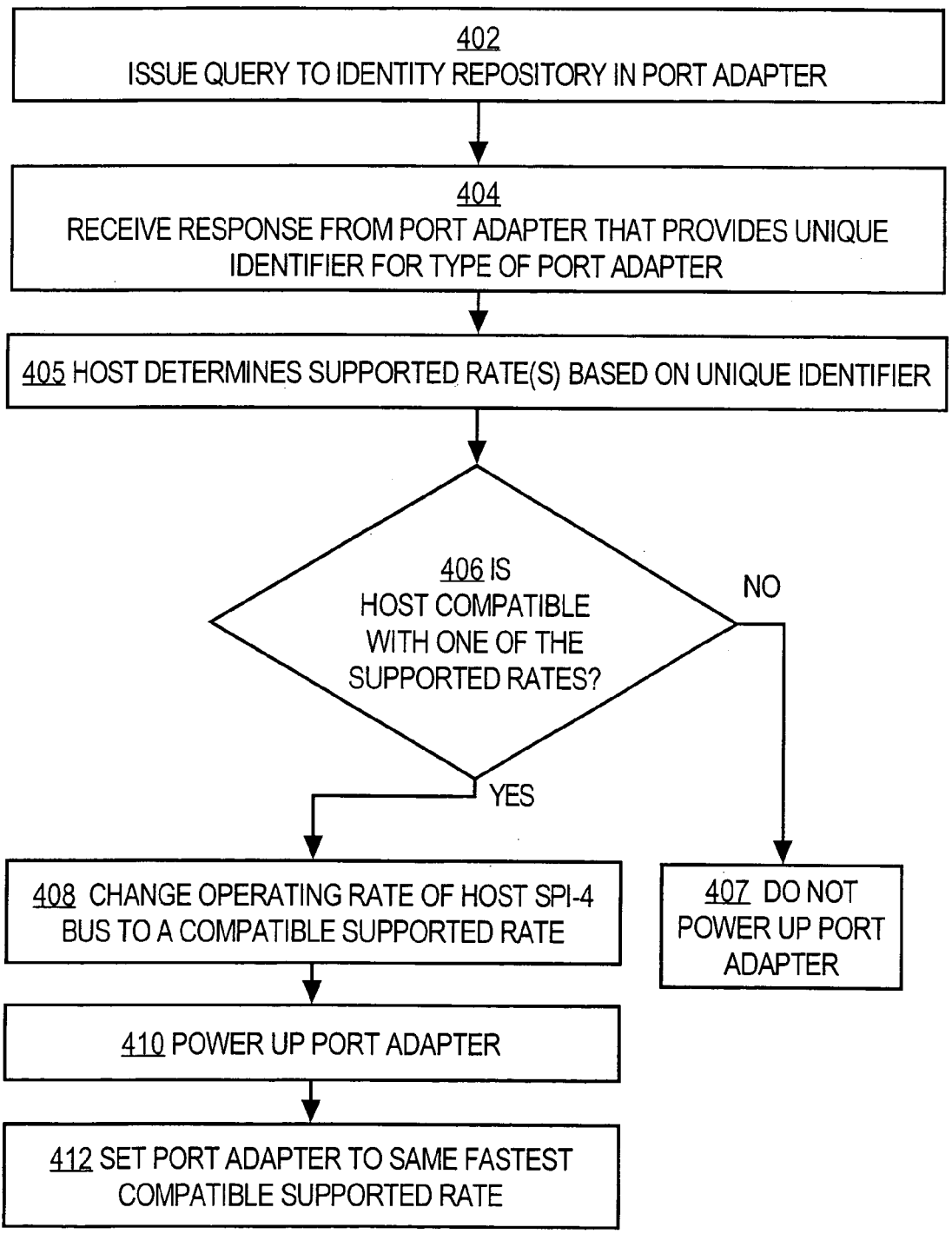
FIG. 4A is a flow diagram of a process of adapting the operational behavior of SPI-4 bus of a host system based on a capability of a port adapter.

FIG. 4A is a flow diagram of a process of adapting the operational behavior of the SPI-4 bus of a host system based on a capability of a port adapter. In block 402, a query is issued to an identification repository in a port adapter. For example, with reference to FIG. 3, host system 100 may issue signals on bus 228A to read the contents of ID EEPROM 212A. Block 402 may be performed before the host system provides power to a port adapter such as port adapter 104D. An identification repository such as ID EEPROM 212A may receive power from a separate power pin in the connector 302, which enables host system 100 to read port configuration information from the port adapter even when the port adapter is powered off.

In block 404, a response is received from the port adapter that includes a unique identifier for the port adapter. For example, reading ID EEPROM 212A results in port adapter 104D providing its unique identifier value. In block 405, the host determines one or more SPI-4 bus operating rates that are supported by the port adapter. For example, the host uses a stored lookup table to associate the received unique identifier value with one or more operating frequency values for the port adapter. Additionally, the host system may determine whether the port adapter can be supported by the host system, and the format of data that is sent by the port adapter on the SPI-4 bus. Alternatively, such values and configuration parameters are provided from the identification repository of the port adapter.

In block 406, the host system determines whether it is compatible with one of the supported rates that the host determined based on the identifier received from the identification repository of the port adapter. Block 406 may involve applying rules 1–4 as denoted above to determine whether a port adapter and host are compatible. For example, if the port adapter supports only quarter rate SPI-4, and the host requires full rate, then the host is not compatible with the port adapter. If the host is not compatible, then in block 407, the host does not power-up the port adapter, which cannot be used by the host system. The rules 1–4 above may be implemented in software executed by the host system.

Optionally, the process involves powering-on the port adapter only when one or more factors are satisfied. For example, block 406 can involve evaluating factors such as: whether the host system has software support for a packet format required by the port adapter; whether the host system has software support for the port adapter; whether the port adapter dissipates less than a maximum amount of power dissipation allowed by the host system; whether the host system can match a bandwidth required by the port adapter; whether a license authorization requirement associated with the port adapter allows the port adapter to run on the host system; etc.

If the host is compatible with the port adapter, then in block 408 the host changes the operating rate of its own SPI-4 bus to the fastest compatible supported rate. For example, if the port adapter identification repository indicates that the port adapter supports both quarter rate and full rate SPI-4, then the host changes its SPI-4 operating rate to full rate. In an alternative embodiment, the host changes the operating rate of its own SPI-4 bus to any one of the compatible supported rates.

In block 410, the host powers-up the port adapter by sending appropriate control signals; in the example of FIG. 2, such signals may be sent on the power control bus 226. In block 412, the host sets the port adapter to the same compatible rate that the host is using. For the example of FIG. 3, host system 100 sends control signals on SPA bus 206A to instruct the port adapter to use a particular rate. The rate that is set may be the fastest compatible rate, or any selected compatible rate.

Optionally, in other embodiments, the order of performing steps 408, 410, 412 may be changed, and the order of performing such steps is not critical.

Thus, using the approach of FIG. 4A, a host can query a port adapter for information about operational characteristics of the port adapter, and based on the received information, the host system determines whether it is compatible, whether to power-on the port adapter, and what operating rate to use.

Further, based on the received information, the host system may determine an operating frequency at which to run the SPI-4 bus. For example, full rate SPI-4 may be used, quarter rate may be used, etc.

The host system may also determine a particular format for data communication on the SPI-4 bus, as described further in section 2.4 below, for example.

2.3 Extended Flow Control Bus

A conventional SPI-4 bus addresses a maximum of 256 channels, and provides support for FIFO queue status indications for 256 channels in a normal addressing mode. However, port adapters that have a large number of channels ("highly channelized" or ATM SPAs, for example) may need 1,000 or more channels. Therefore, it is desirable to have a port adapter flow control bus that can support more than 256 channels per port adapter.

Accordingly, an extended flow control bus and associated method is provided to extend a port adapter to enable use with more than 256 channels. In this arrangement, a port adapter requiring less than or equal to 256 channels may use a conventional SPI-4 control bus for flow control, and optionally may use an extended flow control bus as defined herein. If a port adapter uses the extended flow control bus as defined herein, the port adapter also still uses the conventional SPI-4 flow control bus for gross (rather than subchannel or virtual channel) flow control of traffic aggregates such as port adapter-level or physical port-level flow control.

In one embodiment, Extended Flow Control Bus 222 carries a time domain multiplexed (TDM) calendar frame sync signal, a flow control clock signal, a status signal, and a parity signal. The flow control clock signal provides a source clock that is used by the host to clock in the data value on the status signal, and is sourced by the sender of flow control data, which is normally the port adapter. An example clock frequency is 50 MHz, but any other suitable clock frequency may be used.

In one embodiment, the status signal is a one-bit signal, but other forms of status signaling may be used. The status signal provides an indication whether channel FIFO status is above or below a threshold value, corresponding to the channel programmed for the TDM timeslot. The parity value provides even or odd parity, in various embodiments, across the status signal and frame sync signal for a particular clock cycle. Use of a separate parity signal allows flexibility in changing the frame size to any length, in various embodiments. Optionally, a port adapter may not support the extended flow control bus, in which case the foregoing signals are not connected.

Thus, in an embodiment, the extended flow control bus uses a TDM calendar-based mechanism that carries per-channel FIFO status information over a single data bit. The calendar is programmed by the host system 100 when channels are configured and set up at the port adapter and host. In one embodiment, time slots are allocated in proportion to the bandwidth of the channel. Embodiments may approximate channel bandwidths to the closest power of 2 and may allocate time slots in a way that reduces the total number of flow control time slots. In one embodiment, the calendar comprises a table in which rows correspond to timeslots and columns carry channel numbers and FIFO status information. In one particular embodiment, there are 16584 rows each comprising a channel number in 12 bits and one status bit.

The port adapter uses the calendar to determine which channel is polled for FIFO status and which channel is sent in a particular timeslot or clock period. The host uses a similarly configured calendar to determine which channel's FIFO status flow control information is carried in a particular timeslot.

In one embodiment, the number of supported channels is configurable so that it can adjust to the capabilities of a particular host. For example, a host card may support only 1K flow-controllable entities, and therefore certain port adapters may need to support fewer than the maximum number of channels.

A detailed description of the extended flow control bus is provided in section 2.3 of the Appendix.

2.4 Pre-Processing Packets With Port Adapter

In one embodiment, each port adapter 104A, 104B, 104N may communicate with external networks or devices using any of a large number of network technologies. As a result, data packets that are received at the port adapters may have any of a large number of different formats. In an embodiment, each port adapter provides data to the host in one of a small number of basic packet formats, all of which are understood by the host. For example, in one specific embodiment, four (4) packet formats are used, and a port adapter supports one or more of the four formats to communicate with a host. In this approach, since port adapters are targeted at many different host systems, the formats hide the detail and processing burden associated with a specific media type as much as possible within the port adapter to assist the host to operate at high speed or with less complex packet processing. In addition, the packet formats provide header fields that are as small as possible, to reduce the bandwidth utilized on the SPI-4 bus.

Figure 4B:
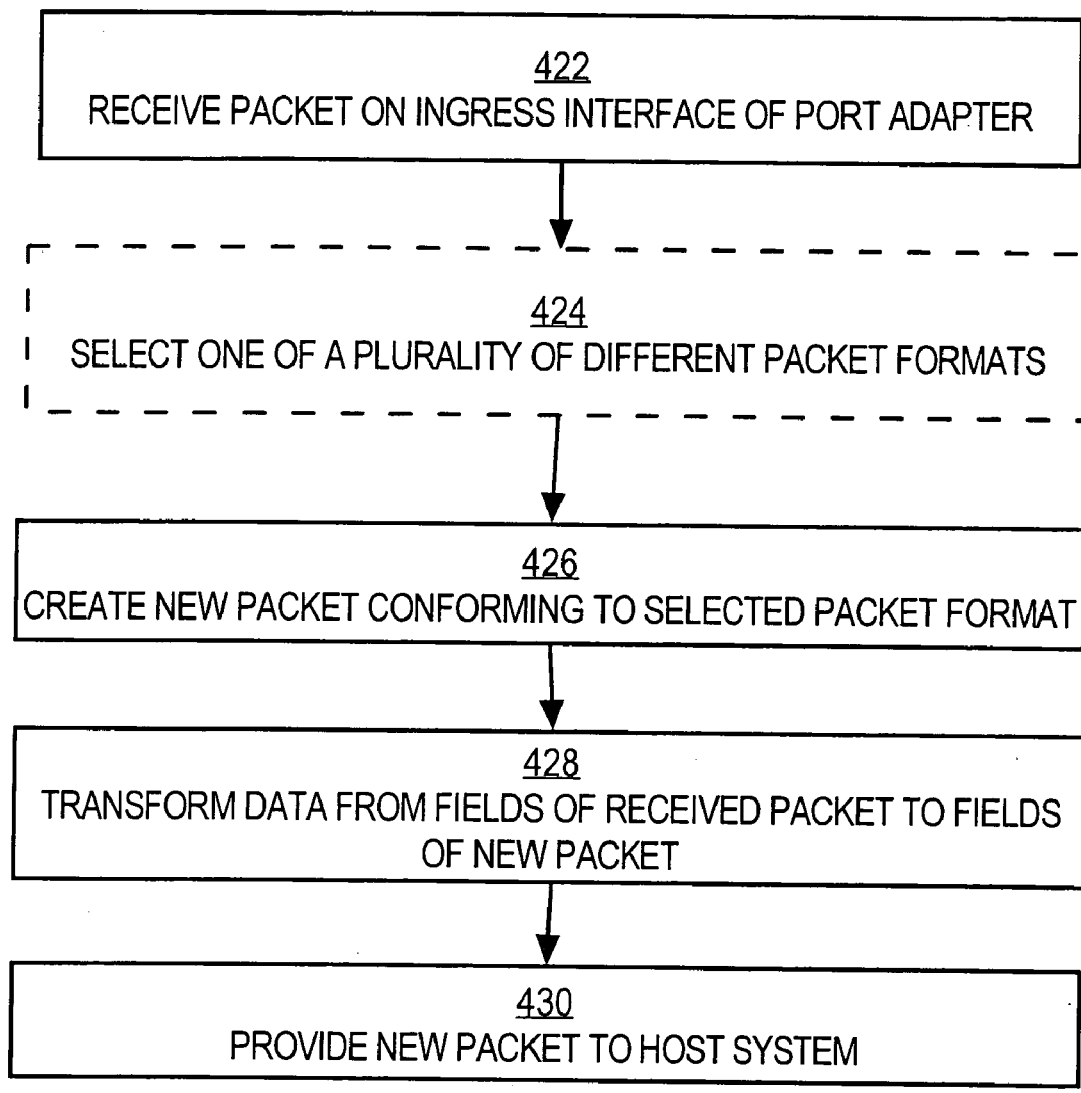
FIG. 4B is a flow diagram that illustrates an overview of a process of transforming received data packets.

FIG. 4B is a flow diagram that illustrates an overview of a process of transforming received data packets.

In block 422, a packet is received on an ingress interface of a port adapter. In one embodiment, the process of FIG. 4B is performed by a port adapter as shown in FIG. 2. Thus, the steps of FIG. 4B may be performed by the SPI-4 termination logic 202, for example. The packet received at block 422 is formatted according to a native packet format of a particular networking technology that is supported by the port adapter. Example technologies include Ethernet, ATM, Frame Relay, etc.

In block 424, one of a plurality of different packet formats is selected. Block 424 typically involves selecting one of several packet formats, e.g., a format other than the native format in which the packet was received. In one specific embodiment described further below, a packet format is selected from among Ethernet SPA 8-byte shim format, ATM SPA 4-byte shim format, Highly Channelized SPA 4-byte shim format, and a no shim format. The selected format may include more or fewer data fields than the fields that are in the received packet. Performing block 424 may comprise simply selecting one specified packet format associated with the then-current port adapter. Further, in the case of a port adapter that supports Ethernet packets, a particular packet format may be selected based on a VLAN identifier carried in a packet.

In block 426, a new packet conforming to the selected format is created.

In block 428, data from the fields of the received packet is transformed into one or more corresponding fields of the new packet. The data transformation may be performed according to a data-driven mapping or programmatic rules that specify which fields of a particular ingress packet format are transformed to which other fields of the target packet format. Further, the mapping or rules may specify transformations of data or values obtained from sources other than the packet, such as interface identifier, packet length, congestion status, packet validity checks, etc.

In block 430, the new packet is provided to the host system. For example, in FIG. 2, the new packet is communicated from SPI-4 termination logic 202 on the host system bus 201 to the host system 100.

The four packet formats used in an embodiment may be designated, for example, as:

Format A: Ethernet SPA 8 byte shim format.
Format B: ATM SPA 4 byte shim format.
Format C: Highly Channelized SPA 4 byte shim format.
Format D: No shim format Each such format is described in detail in the Appendix.

FIG. 5 is a block diagram of a generalized transformed packet format. In the embodiment of FIG. 5, a packet 500 comprises classification bits 502, length indicator 504, source channel label 506, and header fields 508. The classification bits 502 carry information conveying a class value associated with the received packet. The classification information may originally derive from any of several different packet fields, including but not limited to the Type of Service (ToS) field of an IP packet, 802.1q priority information, MAC address filtering information, etc. Length indicator 504 may specify a length adjustment that has been made to the original packet, or may specify an absolute length of the transformed packet. Source channel label 506 specifies a logical or physical channel on which the original packet arrived. Header fields 508 carry information derived from header fields of the original packet.

The generalized format of FIG. 5 may be adapted in various ways to different formats of inbound packets. For example, in an Ethernet SPA 8 byte Shim Format, the port adapter strips Layer 2 encapsulation from a packet entirely and replaces it with an 8-byte shim header that includes all relevant information from the original packet for a forwarding engine of the host to make an efficient forwarding decision. The lower 4 bytes are approximately formatted in the same way as a Frame Relay header, allowing possible simplification of design of the host's forwarding engine.

Stripping the Layer 2 header is optional on a per-packet basis, allowing support for Layer 2 tunnels such as Ethernet over MPLS. If the Layer 2 header is left on the packet, then it can also optionally be padded with two or three bytes to bring the Layer 3 header to 4-byte alignment, as an optional optimization for some hosts. The first byte of the padding indicates the number of padding bytes present, for example.

In this case, because the format of the packet leaving the port adapter can include optional stripping of the variable-length Layer 2 encapsulation, and the addition of a shim header, the Length Indicator value 504 indicates the number of bytes by which the packet is shorter as compared to when the packet was first received. The Layer 3 engine of host system 100 can determine the original Layer 2 length by adding the value of Length Indicator value 504 to the total number of bytes received from the port adapter.

Header fields 508 may include the Protocol ID ("PID") of the Layer 2 header of the packet, and the port adapter may have translated the value. Certain special values of the PID field indicate that the host must apply special treatment to the particular packet; the special values are software configurable. For example, special PIDs may be used to indicate a tunneled packet, exception packet, or other special characteristics. For a tunneled packet, when the VLANID and port number of the arriving packet are configured to enter an Layer 2 tunnel, then the entire packet with its original Layer 2 encapsulation is brought into the host system. An exception packet indicates that the port adapter has detected something about the packet that requires the host to perform special treatment on the packet. More than one exception packet special PID may be defined. This may allow classification of the packets into different priority CPU queues, for example.

Optionally, as part of transforming a first packet into a particular selected packet format, the header 510 and/or body 512 of the original packet may be placed in the transformed packet 500. Thus, the packet format used within the host and port adapter may include the original packet header 510 and/or original packet body 512. The original header and body may be omitted depending on the nature of the traffic that is processed or the context in which it is processed.

Similar transformation techniques may be applied to other different packet formats of inbound packets.

Additionally or alternatively, rather than transforming packets, packets may be dropped. For example, if a port adapter receives a packet from a Layer 2 address or VLAN that is of no interest to the port adapter or host, then that packet may be dropped.

3.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, a port adapter may classify packets as high priority or low priority and provide priority information in the transformed packet format to enable the host to determine which packets to process first. As an alternative to carrying packet priority information in the transformed packet format, two or more logical SPI-4 channels may be associated with one physical port, in which a first logical channel carries port traffic associated with a first priority level and the second or additional channel(s) carry traffic associated with a second or other priority level. In this approach, the host adapter may be configured through software to process all packets arriving on the higher priority channel first without having to consult priority information within the packets.

In another variation of the architecture described above, one of the logical SPI-4 channels may be used as a control path as an alternative to providing some or all control signals on control bus 206 (FIG. 2) or SPA bus 206A (FIG. 3). In this alternative, a specified logical channel carries control packets separate from an associated logical channel that carries port data traffic. The control channel may be considered as having the highest priority for the host. Further, an advantage of this approach is that the control packets may be synchronized or aligned in time with the transmission of associated data packets. Further, the bandwidth of the SPI-4 bus used for the logical channel used for control in this approach is typically higher than the bandwidth of the SPA bus 206A or control bus 206, which may be useful for sending large volumes of control data, statistics, etc.

In still another variation, a specified SPI-4 logical channel can be used to carry flow control information, e.g., in the form of events.

What is claimed is:

1. A method of selectively determining an operating frequency for a SPI-4 bus of a host computer system that uses a port adapter, wherein the operating frequency may be different than a conventional SPI-4 bus operating frequency, the method comprising the steps of:
   issuing a query from a host computer system having a SPI-4 bus to a port adapter, the port adapter comprising a SPI-4 bus that can be coupled to a host system for control and data between the host and the SPI-4 device, a control bus coupled in parallel with the SPI-4 bus between the host system and the port adapter, and interface logic that interfaces the SPI-4 bus and the control bus to one of a plurality of line interfaces, and an identification repository;
   receiving, from the identification repository, an identification of the port adapter;
   determining, based on the information received from the identification repository, whether the host system SPI-4 bus can operate at a frequency that is compatible with at least one of the SPI-4 bus operating frequencies that are supported by the port adapter; and
   setting an operating frequency of the host system SPI-4 bus equal to a selected one of the SPI-4 bus operating frequencies that are supported by the port adapter;
   further comprising powering-on the port adapter only when the host system SPI-4 bus can operate at a frequency that is compatible with at least one of the SPI-4 bus operating frequencies that are supported by the port adapter.

2. A method as recited in claim 1, wherein the setting step further comprises setting an operating frequency of the port adapter to the selected one of the SPI-4 bus operating frequencies.

3. A method as recited in claim 1, wherein the setting step comprises setting the operating frequency of the host system SPI-4 bus equal to a fastest one of the SPI-4 bus operating frequencies that are supported by the port adapter.

4. A method as recited in claim 1, further comprising powering-on the port adapter only when one or more factors are satisfied, wherein the factors are selected from the set consisting of: the host system has software support for a packet format required by the port adapter; the host system has software support for the port adapter; the port adapter dissipates less than a maximum amount of power dissipation allowed by the host system; the host system can match a bandwidth required by the port adapter; or a license authorization requirement associated with the port adapter allows the port adapter to run on the host system.

5. A method as recited in claim 1, further comprising receiving, from the identification repository, values that allow the host to determine whether the port adapter can be supported by the host system, and one or more operating frequencies of the SPI-4 bus.

6. A method as recited in claim 1, further comprising receiving, from the identification repository, values that allow the host to determine a packet format of data that is sent across the SPI-4 bus by the port adapter.

7. A method as recited in claim 1, further comprising receiving, from the identification repository, one or more values specifying a packet format of data that is sent across the SPI-4 bus by the port adapter.

8. A computer system, comprising:
    a host system having a SPI-4 bus coupled to a port adapter,
    the port adapter comprising a SPI-4 bus that can be coupled to the host system for control and data between the host and the SPI-4 device, a control bus coupled in parallel with the SPI-4 bus between the host system and the port adapter, and interface logic that interfaces the SPI-4 bus and the control bus to one of a plurality of line interfaces, and an identification repository, and
    first logic in the host system and second logic in the port adapter configured to perform the steps of:
        issuing a query from the host system to the port adapter;
        receiving, from the identification repository, an identification of the port adapter;
        determining, based on the information received from the identification repository, whether the host system SPI-4 bus can operate at a frequency that is compatible with at least one of the SPI-4 bus operating frequencies that are supported by the port adapter;
        setting an operating frequency of the host system SPI-4 bus equal to a selected one of the SPI-4 bus operating frequencies that are supported by the port adapter; and
        powering-on the port adapter only when the host system SPI-4 bus can operate at a frequency that is compatible with at least one of the SPI-4 bus operating frequencies that are supported by the port adapter.

9. A computer system as recited in claim 8, wherein the logic is configured for powering-on the port adapter only when one or more factors are satisfied, wherein the factors are selected from the set consisting of: the host system has software support for a packet format required by the port adapter; the host system has software support for the port adapter; the port adapter dissipates less than a maximum amount of power dissipation allowed by the host system: the host system can match a bandwidth required by the port adapter; or a license authorization requirement associated with the port adapter allows the port adapter to run on the host system.

10. A computer system as recited in claim 8, wherein the logic is configured for receiving, from the identification repository, values that allow the host to determine whether the port adapter can be supported by the host system, and one or more operating frequencies of the SPI-4 bus.

11. A computer system as recited in claim 8, wherein the logic is configured for receiving, from the identification repository, values that allow the host to determine a packet format of data that is sent across the SPI-4 bus by the port adapter.

12. A computer system as recited in claim 8, wherein the logic is configured for receiving, from the identification repository, one or more values specifying a packet format of data that is sent across the SPI-4 bus by the port adapter.

13. A computer system as recited in claim 8, wherein the logic is configured wherein the setting step further comprises setting an operating frequency of the port adapter to the selected one of the SPI-4 bus operating frequencies.

14. A computer system as recited in claim 8, wherein the logic is configured wherein the setting step comprises setting the operating frequency of the host system SPI-4 bus equal to a fastest one of the SPI-4 bus operating frequencies that are supported by the port adapter.

15. A computer system, comprising:
    a host system having a SPI-4 bus coupled to a port adapter,
    the port adapter comprising a SPI-4 bus that can be coupled to the host system for control and data between the host and the SPI-4 device, a control bus coupled in parallel with the SPI-4 bus between the host system and the port adapter, and interface logic that interfaces the SPI-4 bus and the control bus to one of a plurality of line interfaces, and an identification repository;
    first logic in the host system and second logic in the port adapter comprising:
        means for issuing a query from the host system to the port adapter;
        means for receiving, from the identification repository, an identification of the port adapter;
        means for determining, based on the information received from the identification repository, whether the host system SPI-4 bus can operate at a frequency that is compatible with at least one of the SPI-4 bus operating frequencies that are supported by the port adapter;
        means for setting an operating frequency of the host system SPI-4 bus equal to a selected one of the SPI-4 bus operating frequencies that are supported by the port adapter; and
        means for powering-on the port adapter only when the host system SPI-4 bus can operate at a frequency that is compatible with at least one of the SPI-4 bus operating frequencies that are supported by the port adapter.

16. A computer system as recited in claim 15, wherein the logic comprises means for powering-on the port adapter only when one or more factors are satisfied, wherein the factors are selected from the set consisting of: the host system has software support for a packet format required by the port adapter; the host system has software support for the port adapter; the port adapter dissipates less than a maximum amount of power dissipation allowed by the host system: the host system can match a bandwidth required by the port adapter; or a license authorization requirement associated with the port adapter allows the port adapter to run on the host system.

17. A computer system as recited in claim 15, wherein the logic comprises means for receiving, from the identification repository, values that allow the host to determine whether the port adapter can be supported by the host system, and one or more operating frequencies of the SPI-4 bus.

18. A computer system as recited in claim 15, wherein the logic comprises means for receiving, from the identification repository, values that allow the host to determine a packet format of data that is sent across the SPI-4 bus by the port adapter.

19. A computer system as recited in claim 15, wherein the logic comprises means for receiving, from the identification repository, one or more values specifying a packet format of data that is sent across the SPI-4 bus by the port adapter.

20. A computer system as recited in claim 15, wherein the logic comprises means for setting an operating frequency of the port adapter to the selected one of the SPI-4 bus operating frequencies.

21. A computer system as recited in claim 15, wherein the logic comprises means for setting the operating frequency of the host system SPI-4 bus equal to a fastest one of the SPI-4 bus operating frequencies that are supported by the port adapter.

* * * * *